United States Patent [19]

Johnston

[11] Patent Number: 4,698,973
[45] Date of Patent: Oct. 13, 1987

[54] CLOSED LOOP SOLAR COLLECTOR SYSTEM POWERING A SELF-STARTING UNIFLOW ENGINE

[76] Inventor: Barry W. Johnston, 1622 Q St., Washington, D.C. 20009

[21] Appl. No.: 790,644

[22] Filed: Oct. 23, 1985

Related U.S. Application Data

[63] Continuation of Ser. No. 520,240, Aug. 4, 1983, abandoned.

[51] Int. Cl.$^4$ ............................................. F01K 21/00
[52] U.S. Cl. ..................................... 60/670; 417/125; 91/4 R; 60/516; 60/671
[58] Field of Search ................... 60/516, 641.8, 651, 60/670, 671; 91/4, 6; 417/125

[56] References Cited

U.S. PATENT DOCUMENTS

| | | | |
|---|---|---|---|
| 2,250,389 | 7/1941 | Miller | 91/6 X |
| 2,373,167 | 4/1945 | Cherry et al. | 91/6 X |
| 3,005,417 | 10/1961 | Swaney | 417/125 |
| 3,878,764 | 4/1975 | Zech | 91/517 X |
| 4,006,595 | 2/1977 | Forbes | 60/651 |
| 4,086,765 | 5/1978 | Gillilan | 417/125 X |
| 4,213,303 | 7/1980 | Lane | 60/641.15 |
| 4,270,350 | 6/1981 | Chevalier | 60/671 X |
| 4,408,960 | 10/1983 | Allen | 417/125 |

Primary Examiner—Allen M. Ostrager
Attorney, Agent, or Firm—Lowe, Price, LeBlanc, Becker & Shur

[57] ABSTRACT

A closed loop solar collector system includes a fluid receiver for collecting solar heat to vaporize a working fluid therein. A uniflow engine connected to the receiver, is powered by the vaporized fluid to power a water wheel. The engine includes a single piston acting directly upon a pair of normally closed intake valves projecting into the engine cylinder. Under low boiler pressure conditions, a spring loaded connecting rod having depending arms each engaging one of the intake valve rods when in a normally raised position coordinates simultaneous opening or closing of the valves with a detent mechanism, enabling the piston to operate in a nonexpanding state. At high boiler pressures, the connecting rod disengages from the intake valve by means of a transmission rod and follower acted upon by outwardly displaced weights provided on a flywheel powered by the engine drive shaft so that the piston operates in the expanding state. Exhausted vaporized fluid discharged from the engine enters a condensor alternately connected in series with first and second holding tanks so that the receiver fills with water draining from one of the tanks while the other tank refills with water from the condensor. The alternating cycle is controlled by steam actuated valves in response to fluid levels inside the holding tanks. The tanks are mounted to feed water to the receiver under gravity and under pressure of vaporized fluid entering the tanks from the receiver.

21 Claims, 14 Drawing Figures

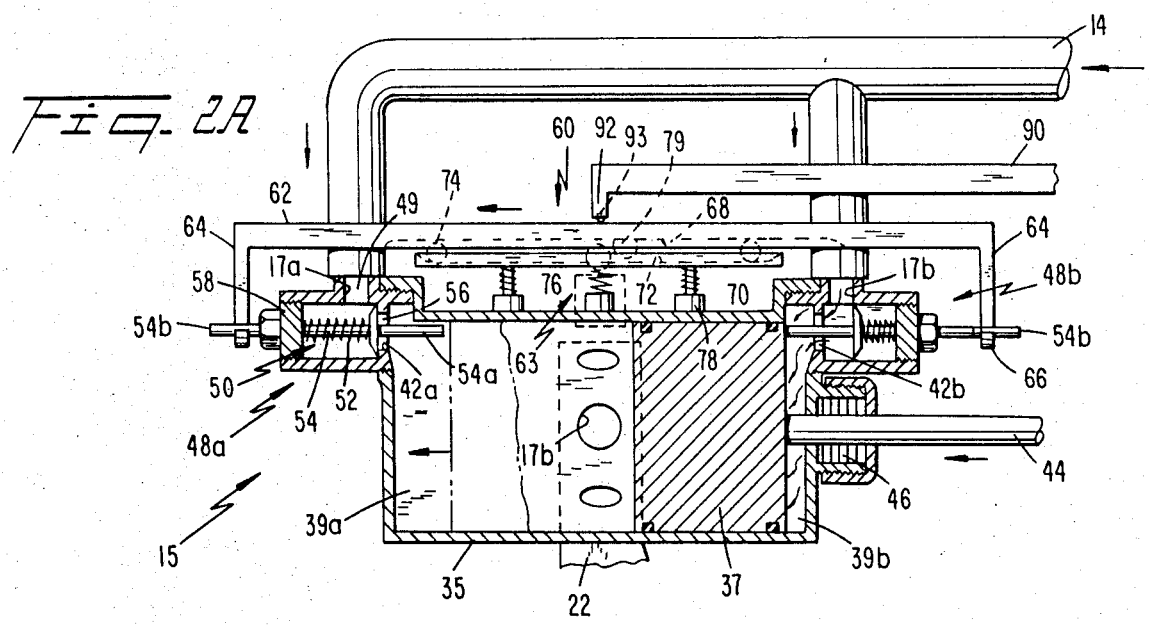
Fig. 2A
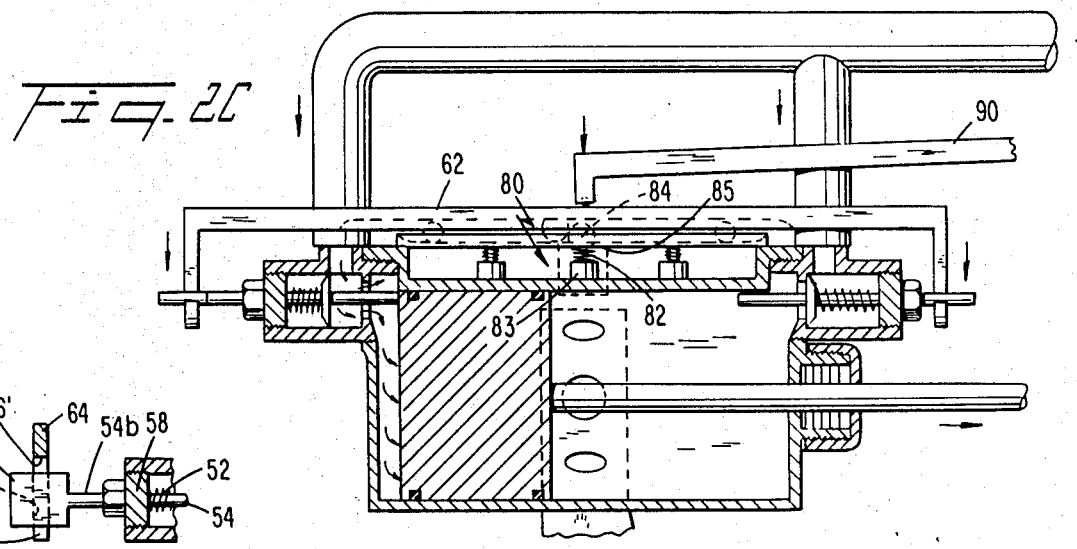
Fig. 2C
Fig. 2D
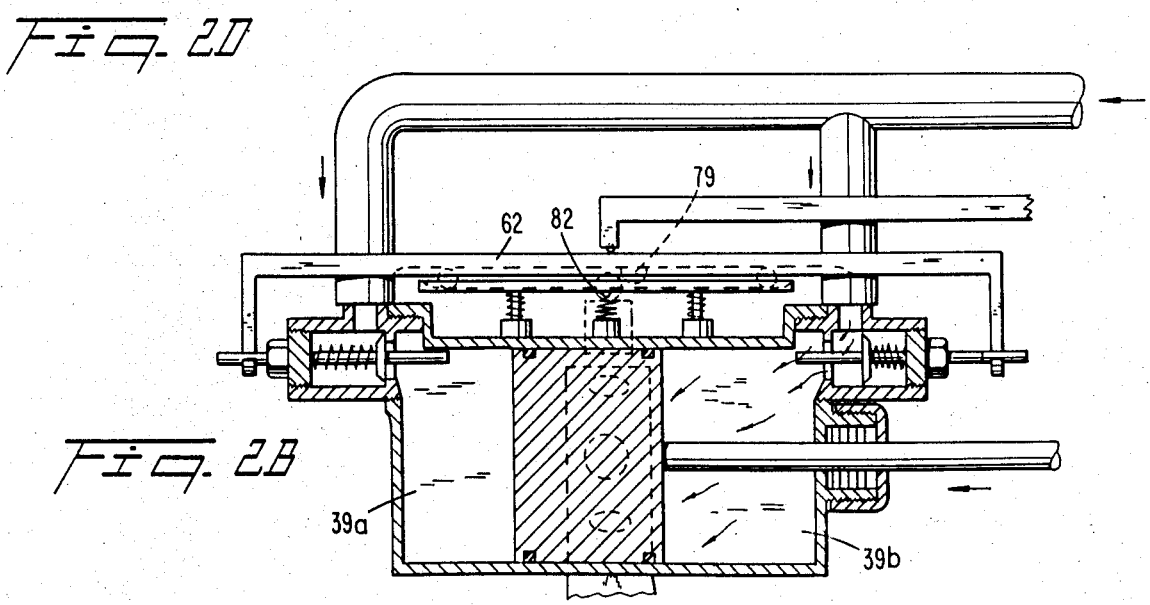
Fig. 2B

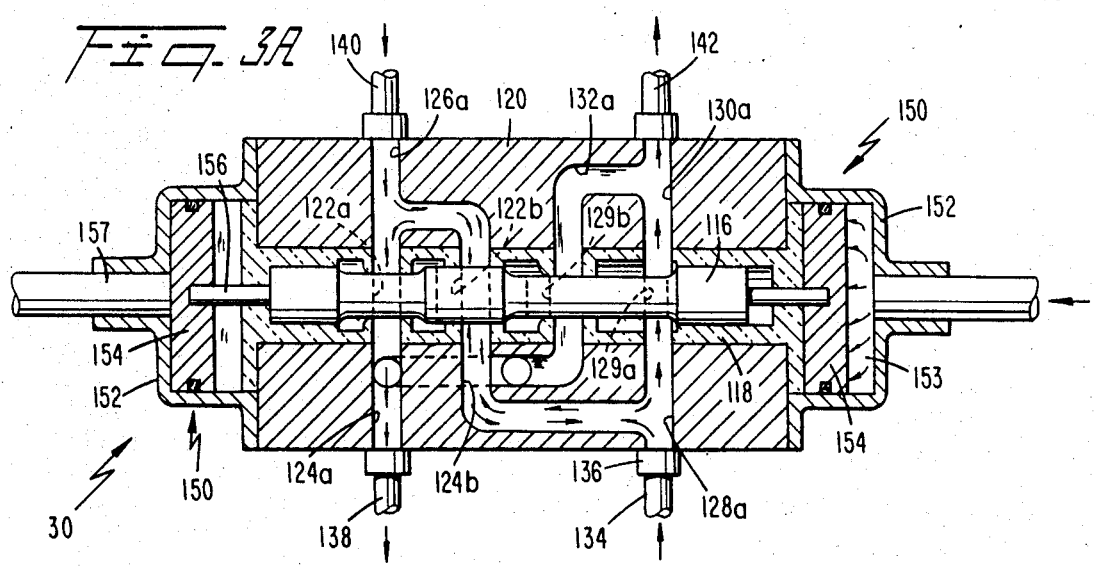
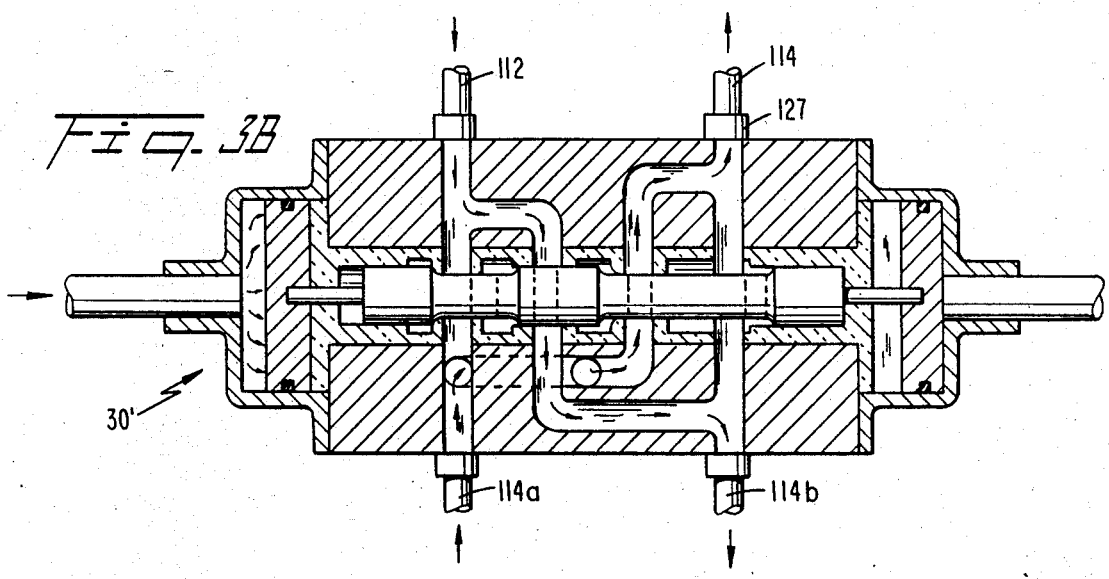
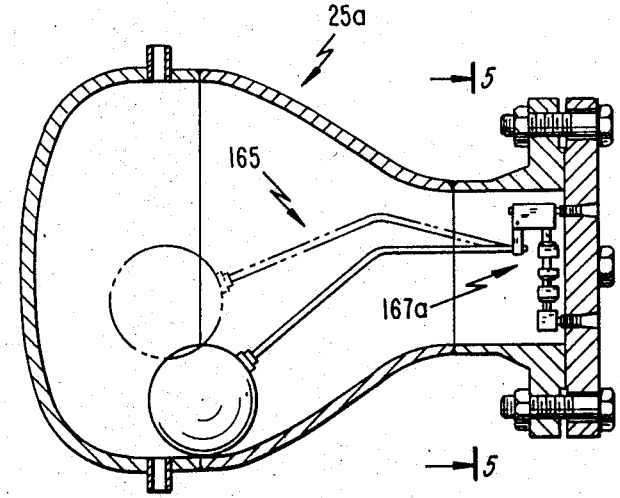
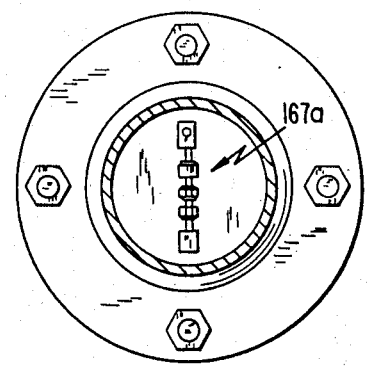

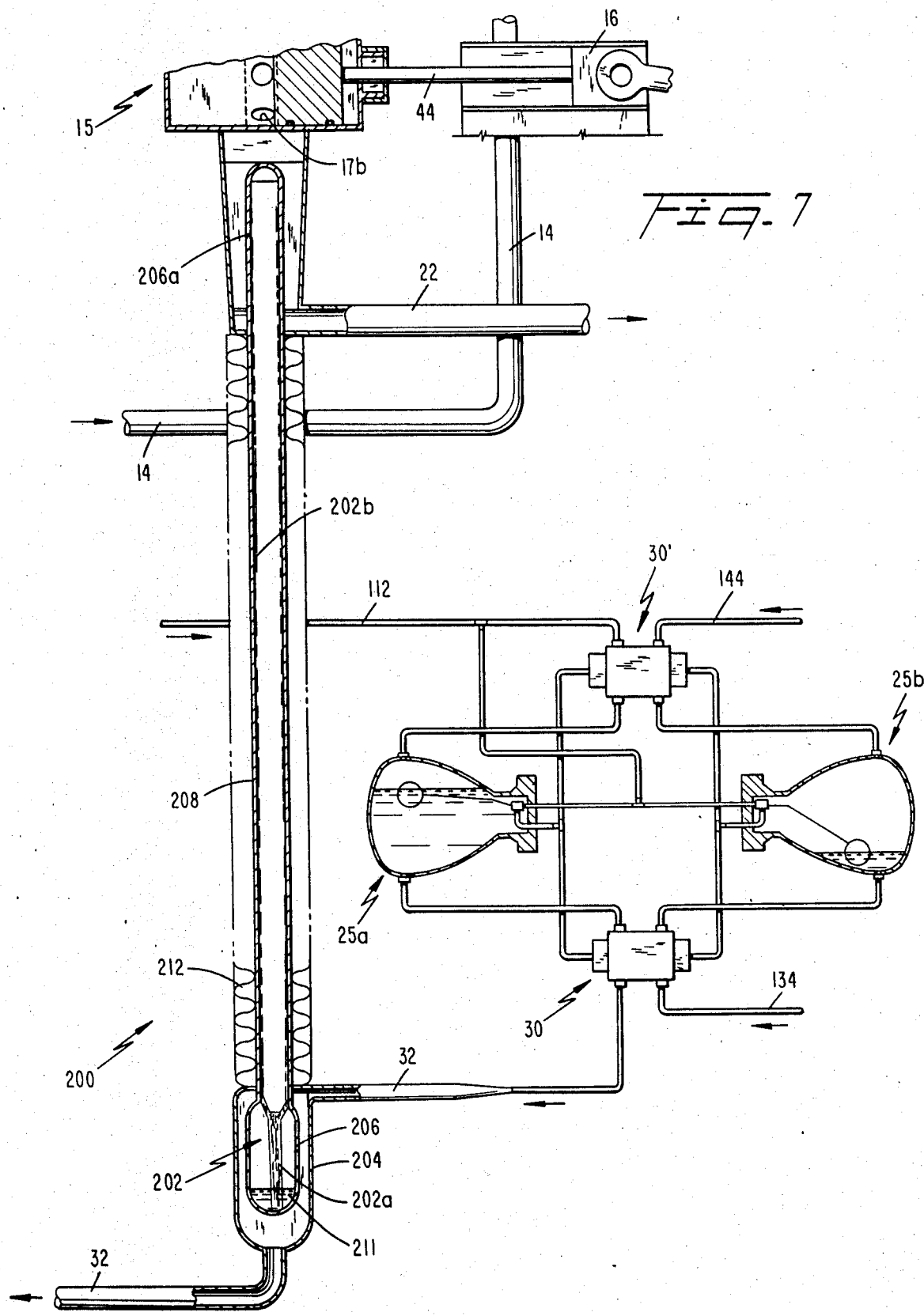

CLOSED LOOP SOLAR COLLECTOR SYSTEM POWERING A SELF-STARTING UNIFLOW ENGINE

This application is a continuation, of application Ser. No. 520,240, filed Aug. 4, 1983 now abandoned.

TECHNICAL FIELD

This invention relates generally to solar collector systems. The invention relates more particularly, to a closed loop solar collector system having an automatic, self-starting recirculation system for circulating a working fluid from a condensor to a linear receiver tube to vaporize working fluid within the receiver, as well as to an improved, self-starting uniflow steam engine powered by vaporized working fluid supplied from the receiver.

BACKGROUND ART

One type of closed loop solar collection system known in the prior art includes a concentrating cylindrical parabolic reflector focusing solar energy on a linear vaporizer tube aligned along the focal line of the reflector. A quantity of vaporizable heat transfer or working fluid, such as water, is vaporized within the tube and flows out one end through a pipe to drive a steam engine, turbine or other device. In a steam engine, for example, vaporized fluid drives a piston to deliver power for a variety of applications, e.g., pumping water for irrigation. After the working fluid drives the piston through a stroke, spent low enthalpy vaporized fluid is discharged through a series of discharge ports provided within the cylinder of the engine. The fluid flows from the discharge ports through a pipe into a condensor, where heat from the vaporized fluid is extracted, condensing the fluid. The condensed fluid is then pumped to a storage tank to resupply the receiver.

In conventional closed loop solar collection designs of which I am aware, electrically operated servo-type valves are used to control the engine intake valves to maximize engine efficiency. However, since this type of electronic steam injection technique requires an outside source of electrical power, it is impractical at remote or wilderness sites. On the other hand, manually operated valve mechanisms to control engine speed require sophisticated valve linkages to maximize engine efficiency by tailoring valve operation to variations in engine load.

Another problem associated with various closed loop solar collector systems is in utilizing an electrically driven circulation pump to control the flow of condensed fluid from the supply tank into the receiver. Apart from requiring an outside source of electrical power to operate such auxiliary pumps, frequent maintenance is often necessary in rugged and hostile environments, such as at remote or wilderness sites. If the pump fails, insufficient fluid is released into the receiver tube, allowing the tube to run dry and thereby to overheat.

It is accordingly an object of the present invention to provide a closed loop linear concentrating solar collecting system having improved means for regulating the flow of a heat transfer or working fluid through the system.

Another object is to provide a closed loop concentrating solar collector system having an automatic fluid circulating means which requires no source of power, other than the sun, for operation, and which is capable of controlling the level of working fluid in a fluid receiver or boiler.

A further object is to provide a system that is simple to construct and reliable in rugged and hostile environments with minimal supervision and maintenance.

Still another object is to provide a circulatory system that is capable of operating continuously and reliably for long periods of time.

Still a further object is to provide a steam engine having improved means for controlling engine operation under a wide range of receiver tube pressures for efficient power delivery.

Yet a further object is to provide a steam driven engine that is automatically self-starting and requires no manual adjustment or intervention to maximize engine operating efficiency.

DISCLOSURE OF THE INVENTION

A closed loop solar collector system, in accordance with the invention, comprises a fluid receiver a boiler aligned along the focal line of a cylindrical parabolic reflector exposed to sunlight. Vaporized fluid flows out one end of the receiver tube to drive a steam engine and is discharged from the engine to a condensor for condensation. The condensed fluid flows by gravity into one of a pair of tanks connected to alternately receive fluid from the condensor and recycle fluid to the receiver.

Circulation of condensed fluid from the condensor to the receiver via the first or second tanks is controlled by first and second, steam operated control valves preferably actuated by vaporized fluid supplied from the receiver. The first and second valves, in fill and drain cycles, alternately connect each of the tanks to the condensor and receiver, respectively. Each first and second control valve is a two-way valve having a pair of steam driven piston assemblies connected to drive a valve stem in first and second directions, controlling fluid flow to the receiver through a series of straight and cross passages formed in each valve. Each valve is connected to the receiver through a pair of normally closed float actuated valve assemblies provided respectively in the first and second tanks. Each float valve normally opens to actuate both control valves when the level of condensed fluid in one of the tanks reaches a predetermined minimum level due to vaporization of a substantial quantity of fluid contained in the receiver tube.

The first control valve is connected to fill one of the tanks with condensed fluid supplied from the condensor while allowing the other tank to drain into the receiver by gravity. Simultaneously, the second control valve operates to admit steam or vaporized fluid from the receiver through a conduit into an upper part of the draining tank to assist fluid flow by preventing a vacuum from occurring within the tank. Vaporized fluid trapped within the filling tank is released through the second valve to the low pressure side of the condensor where the vaporized fluid recondenses and returns to the filling tank for reuse. The steam actuated first and second control valves thus provide automatic start up and cycling of condensed fluid, without auxiliary pumps or external energy sources.

In accordance with another aspect of the present invention, the steam engine includes a cylinder having a pair of inlet openings located at opposite ends of the engine and a central discharge port between the inlet openings. The inlet openings communicate with the receiver to receive pressurized, vaporized working fluid through an intake line. A piston movable within the cylinder includes a drive shaft connected for delivery of power. First and second, normally closed, intake poppet valves within the intake openings are each opened by the piston as it travels toward one end of its stroke. The valves admit pressurized fluid alternately into one of the cylinder chambers located on opposite sides of the piston. Each chamber communicates with the receiver tube through the first and second inlet valves.

To improve engine efficiency, a spring-loaded connecting rod includes a pair of arms simultaneously engageable with a valve rod of each inlet valve to operate the valves when pressure of vaporized fluid supplied to the engine is below a predetermined pressure. A detent mechanism retains the connecting rod stationary to maintain one valve open and the second closed as the piston travels out of contact with the open valve. The connecting rod is slidable along roller bearings to close the first valve and open the second valve when the piston, operating in a non-expanding state, contacts the second valve with a force sufficient to overcome the bias of the detent. When pressure of vaporized fluid can no longer power the piston (i.e., approaching a stalled condition), the connecting rod and detent mechanism arrangement assures that one of the valves is always open while the other is closed, under low pressure conditions, to enable automatic start up of the engine without manual intervention.

The steam engine of the present invention further includes a flywheel or centrifugal clutch driven by the piston drive shaft. The flywheel includes circumferentially mounted, radially inwardly spring biased weights displaced outwardly when subjected to sufficient centrifugal force during flywheel rotation corresponding to increasing vaporized fluid pressure from the receiver reaching the predetermined level in the engine. A follower tangentially contacts the weights and is pivotally mounted to rotate a lever arm into contact with the connecting rod, causing the rod arms to disengage from the first and second valves. Thus, during high engine pressure, operation of the inlet valves is controlled directly by contact between the associated valve rod and the piston operating in an expanding state.

Still other objects and advantages of the present invention will become readily apparent to those skilled in this art from the following detailed description of the invention, wherein I have shown and described only the preferred embodiment of the invention, simply by way of illustration of the best mode contemplated by me of carrying out my invention. As will be realized, the invention is capable of modifications in various obvious respects, all without departing from the invention. Accordingly, the drawings and description are to be regarded as illustrative in nature and not as restrictive.

BRIEF DESCRIPTION OF THE DRAWING

FIGS. 2A-2C are detailed cross-sectional views of the steam engine of the present invention to illustrate various modes of engine operation during low and high pressures within the receiver tube;

FIG. 2D is an enlarged, partial top plan view to illustrate a preferred form of engagement between a valve rod and connecting rod arm during low pressure engine operation below the predetermined pressure level;

FIGS. 3A and 3B are detailed cross-sectional views respectively of the first and second control valves in the first and second valve positions;

FIG. 4 is a detailed cross-sectional view of a condensed fluid holding tank for receiving condensed fluid from the condensor to resupply the receiver;

FIG. 5 is a sectional view taken along the line 5—5 of FIG. 4 to further illustrate the float valve and vaporized fluid coupling of the invention;

FIG. 7 is an illustration of a regenerator of the invention used to preheat working fluid entering the receiver from one of the holding tanks.

BEST MODE FOR CARRYING OUT THE INVENTION

Figure 1:
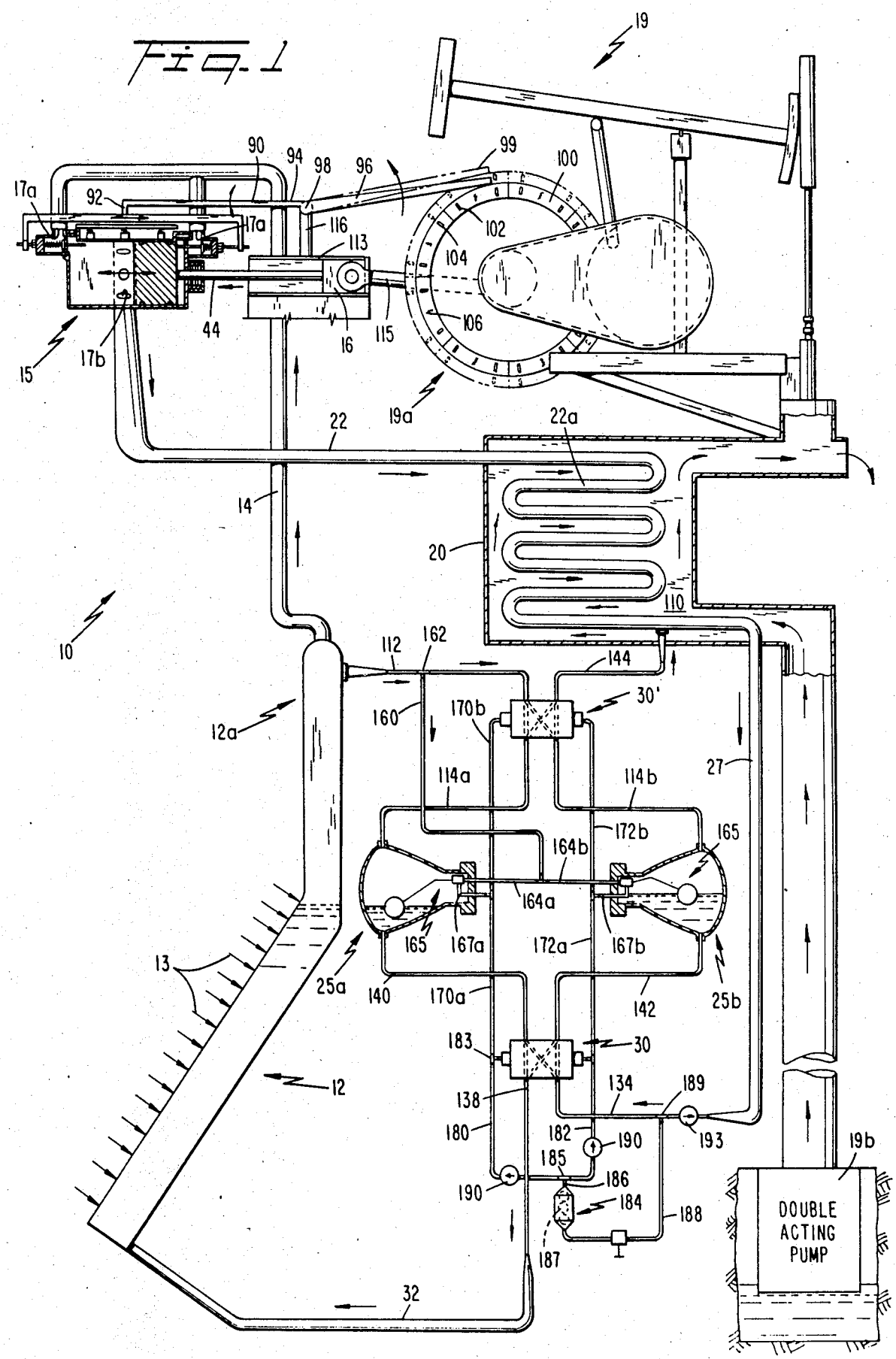
FIG. 1 is a partial cross-sectional and partial schematic view of the solar collector system of the present invention.

Referring to FIG. 1, a closed loop solar collector system 10 of the invention comprises a linear fluid receiver or vaporizer tube 12 aligned along a focal line of a cylindrical reflector (not shown). A measured quantity of vaporizable working fluid, such as water, is contained within vaporizer tube 12. Solar energy (indicated by arrows 13) concentrated on vaporizer tube 12 by the reflector causes the working fluid to boil (vaporize) and as a result produces a substantial amount of pressure within tube 12. An outlet end or steam dome 12a of tube 12 is connected to an inlet pipe 14 to deliver vaporized working fluid under pressure to a uniflow engine 15 through inlet openings 17a to power a pumping jack 19 in the unique manner described below.

Once used to drive engine 15 in a single power stroke, as described hereinafter, vaporized working fluid is discharged from the engine through central exhaust ports 17b and outlet pipe 22 to a condensor 20. Thereafter, condensed working fluid flows into one of first and second holding tanks 25a and 25b through a feed pipe 27 and a first control valve 30 while the other of said tanks feeds condensed fluid through the first control valve and a return line 32 to receiver 12 for reheating, in the unique manner described below.

Referring to FIGS. 2A-2C, engine 15 comprises a single cylinder 35 containing a piston 37 slideably disposed within the cylinder. Piston 37 defines a pair of opposite cylindrical chambers 39a and 39b within cylinder 35. The central discharge ports 17b in cylinder 35 exhaust steam entering chambers 39a and 39b (through one of intake openings 42a or 42b respectively) after piston 37 has traveled practically the entire length of its stroke. A drive shaft 44 extending through a seal housing 46 located on one of the cylinder end walls is connected to drive a flywheel 19a or a centrifugal clutch of pump jack 19.

A pair of inlet valve housings 48a and 48b are respectively threaded onto intake openings 42a, 42b to control the flow of steam into chambers 39a, 39b. Each housing 48a, 48b includes a lateral inlet port 49 connected to branches of inlet pipe 14. An inlet valve assembly 50 in each housing 48a, 48b includes a compression spring 52 disposed about a plunger valve rod 54 between a valve head 56 and a plug 58 closing off the outer end of each housing. Valve 50 is normally closed with valve head 56 seated against each opening 42a, 42b. Each valve rod 54 includes an inwardly extending portion 54a projecting axially into one of chambers 39a, 39b through valve head 56 parallel to the longitudinal axis of piston 37. As the piston travels into a position at one end of its stroke, into contact with valve rod 54a (see e.g. FIG. 2A), valve 50 opens against the bias of spring 52 to admit vaporized working fluid into the associated chamber 39a, 39b while steam on the exhaust side of the piston is discharged through ports 17b to condensor 20 through pipe 22. An outwardly extending portion 54b of each rod 54 projects through plug 58 for purposes described hereinafter.

Under low load conditions (i.e. pressure of vaporized working fluid from receiver 12 is below a predetermined level), engine 15 operates most efficiently when each of inlet valves 50 is open for a period of time sufficient to enable the pressure in cylinder 35 to approach pressure conditions within the receiver, preventing piston 37 from overthrottling. Thus, at low pressure, it is preferred to maintain one of inlet valves 50 open after piston disengages valve rod 54a at the initial part of the power stroke so that vaporized working fluid at boiler pressure acts directly upon the piston throughout the stroke (i.e. operating in a non-expanding state) for improved efficiency.

Under high pressure conditions, engine 15 operates most efficiently in an expanding state, i.e., the opening and closing time of each valve 50 is controlled by direct contact between the reciprocating piston and one of valve rods 54a allowing a limited, compressed quantity of high pressure, vaporized working fluid to enter one of chambers 39a, 39b and expand (without communication with receiver 12 through valve 50) to drive the piston in the power stroke.

To improve the efficiency of engine 15 under low and high pressure conditions within receiver 12, a unique inlet valve actuating mechanism 60 includes a connecting rod 62 simultaneously engageable with the valve rod portion 54b of each inlet valve 50 to coordinate opening and closing of the valve under low pressure conditions. As illustrated in FIG. 2A, connecting rod 62 extends longitudinally parallel to the axis of piston travel outside cylinder 35. Rod 62 has a pair of arms 64 that project downwardly from opposite ends thereof. Each arm 64 includes an upwardly directed U-shaped end 66 defining a slot 66' located to engage and capture each valve rod 54b by engaging a downwardly facing slot 67' formed in flat portion 67 of rod 54b when rod 2 is in its normally raised position (corresponding to low pressure conditions; see FIGS. 2A and 2D) as described hereinafter.

Connecting rod 62 in raised position, maintains one of valves 50 open with detent mechanism 63 until piston 37 reaches an end of stroke position to contact the other valve. Thereafter, the connecting rod slides longitudinally to reverse the valve positions. As illustrated in FIG. 2A, rod 62 has a channel 68 that faces downwardly. A track 70 is mounted between cylinder 35 and rod 62 and includes an upwardly directed channel 72 facing channel 68. Ball bearings 74 disposed within channels 68, 72 define a slide path permitting low friction, smooth sliding movement of the rod with respect to the track. A pair of compressed springs 76 disposed between track 70 and the cylinder 35 in spring housings 78 bias the track and bearings 74 upwardly to lift connecting rod 72 to the normally raised position engaging valve rods 54b.

Detent mechanism 63 includes a spherical nipple 79 affixed at a central position within channel 68. A poppet assembly 80 includes a compression spring 82 disposed within a spring housing 83 attached to cylinder 35. Spring 82 urges a ball 84 upwardly through an opening 85 formed midway in the bottom of channel 72 into the slide path of nipple 79.

With reference to FIGS. 2A and 2B, a single power stroke of piston 37 operating at low pressure is shown. At low pressure, as vaporized working fluid enters chamber 39b through intake opening 42b (FIG. 2A) and open valve 50, piston 37 begins to move out of contact with valve rod 54b. It should be observed that, under high pressure, disengagement of the piston from the valve rod causes the associated inlet valve to close under the compression force of spring 52. However, it can be seen from the intermediate position of piston 37 in FIG. 2B that ball 82 abuts nipple 79 under the compression force of detent spring 82, maintaining the valve open since connecting rod arm 64 holds valve rod portion 54b captive via engagement between slots 66', 67'. Because connecting rod 62 cannot slide due to the aforesaid detent engagement, the valve remains open, allowing pressure within chamber 39b to build up to boiler pressure.

As piston 37 travels into contact with rod 54a of the closed valve (see dotted line position in FIG. 2A) the piston exerts a force transmitted to ball 84 through the closed valve rod and the connecting rod. If the amount of force exerted by piston 37 is sufficient to overcome the bias of detent spring 82, nipple 79 forces ball 84 downward through opening 85 in track 70 (not shown in detail). In this manner, the nipple travels past the over center position of poppet assembly 80, allowing connecting rod 62 to slide to the left so that the inlet valves simultaneously reverse positions for the next power stroke.

To disengage connecting rod 62 from inlet valves 50 for efficient high pressure engine operation, inlet valve control mechanism 60 of the invention further includes a disengagement mechanism constituted by a lever arm 90 and a follower 96. As illustrated in FIGS. 1 and 2A-2C, arm 90 has a free end 92 containing a ball bearing 93 resting against connecting rod 62 and an opposite end 94 attached to one end of follower 96 at a fulcrum point 98. As shown in FIG. 1, the opposite end 99 of follower 96 tangentially contacts a series of weights 100 which are circumferentially mounted on flywheel 19a (or a centrifugal clutch monitoring torque output of engine 15) of pump jack 19. Weights 100 are mounted for radial movement on flywheel 19a by pins 102 attached to the flywheel which pass through radially extending slots 104 formed in the weights. Springs 106 are connected to flywheel 19a to bias weights 100 radially inwardly.

Pump jack 19 is of a known construction, such as Model 25W manufactured by Jensen Brothers Manufacturing Co., Inc., Coffeyville, Kansas 67337. Flywheel 19a is modified to carry weights 100 in the aforesaid manner, equally distributed about the flywheel. The radial weights could also be those utilized in a centrifugal clutch between the engine and pump jack, the clutch mounted to assist in minimizing drag on engine start-up. The piston drive shaft 44 drives the flywheel through a reciprocating block 16 (slidably disposed within a block housing 113) connected to the flywheel through a crank arm 115. A support post 116 affixed to housing 113 projects upward to support lever 90 and follower 96 at fulcrum 98 between the engine and flywheel.

Since flywheel 19 is powered directly by piston 37, it will be appreciated that the speed of flywheel rotation corresponds directly to pressure of vaporized working fluid powering engine 15. Thus, as working fluid pressure increases to a predetermined pressure level (corresponding to the point at which engine 15 operates more efficiently in an expanding piston state), weights 100 are displaced outwardly by centrifugal force against the bias of springs 106 (see phantom line position in FIG. 1), causing follower 96 to lift and rotate lever 90 counterclockwise against connecting rod 62. In this manner, connecting rod 62 is forced downward (see FIG. 2C), overcoming the bias of springs 76, causing connecting rod arms 64 (i.e., slots 66') to disengage from inlet valve rods 54b (slots 67'). Thus, at operating pressures in excess of the predetermined pressure level, engine 15 operates efficiently in an expanding piston state in the manner described supra.

In the event the sun is obscured by clouds, or at night, causing pressure of vaporized fluid supplied to engine 15 from receiver 12 to decrease, weights 100 retract as flywheel 19a powers down. As the predetermined pressure level is reached, compression springs 76 overcome the pressing force of lever 90, raising connecting rod arms 64 into contact with inlet valve rods 54b so that slots 66', 67' engage. In this manner, piston 37 once again operates efficiently in the non-expanding piston state, described supra.

The aforesaid connecting rod and detent arrangement of the present invention uniquely provides for automatic start-up of engine 15 by assuring that one of inlet valves 50 remains open as piston 37 stalls (usually in a position between the inlet valves). As explained above, when piston 36 operates under low pressure, the amount of force exerted by the piston on the closed inlet valve rod (when the piston travels into the end of stroke position) must be sufficient to overcome detent mechanism 63 so that inlet valves 50 reverse position. However, should piston 37 exert insufficient opening force on the closed valve rod as the piston cycles down (or stall in a center position of its work stroke) detent mechanism 63 maintains the position of the open inlet valve 50. Thus, the connecting rod and detent mechanism of the present invention provides automatic start of engine 15 without the need for additional activating mechanisms (e.g., electrically operated solenoids) or energy sources by assuring that one of valves 50 always remains open to receiver 12 as piston 37 stops. Further, since the connecting rod and detent mechanism of the invention coordinate opening and closing action of valves 50 only during start-up and under low pressure conditions within engine 15 (i.e., below the predetermined pressure level), wear on rod 62 and detent 63 is advantageously reduced.

Referring back to FIG. 1, condensor or heat exchanger 20 receives vaporized fluid discharged from exhaust ports 17b of engine 15 through outlet pipe 22. Once in condensor 20, vaporized working fluid circulates within loop 22a in thermal contact with a heat absorption medium 110 (e.g. well water) supplied to the condensor by well pump 19b and jack 19. Medium 110 absorbs heat from the downwardly flowing vaporized working fluid. As the vapor releases its latent heat of vaporization to medium 110, the vapor condenses and continues to flow downward, under the influence of gravity, to one of tanks 25a or 25b through pipe 27 and first control valve 30, as discussed below.

While medium 110 is shown to be water supplied to condensor or heat exchanger 20 by pump 19, the heat absorption medium can be a different fluid used, for example, to heat a home or office building, heat water or operate the vaporization cycle of an air conditioning unit. Of course, well pump 19b and jack 19 can be replaced by different pumping means, and many other uses of heat stored by medium 110 will occur to those skilled in the art.

Tanks 25a, 25b are respectively alternately connected through first control valve 30 so that one tank receives condensor fluid through the first valve from condensor 20 while the other tank meters fluid through the first valve to receiver 12 under gravity and under pressure from vaporized fluid supplied from the receiver alternately to the upper portion of each tank through a steam line 112, a second control valve 30', and inlet lines 114a and 114b. As explained more fully below, first and second control valves 30, 30' are two way valves, such as Series CC12 air control valves available from Parker Hannifin Corporation, Otsego, Michigan, operating in first and second positions to alternate the drain and fill cycle of tanks 25a, 25b when actuated by pressure of vaporized fluid from receiver 12.

FIGS. 3A and 3B are detailed views of control valves 30, 30' (of identical construction with identical reference numerals used to designate the valve components) in first and second positions, respectively. First valve 30, mounted beneath tanks 25a, 25b, operates to pass only condensed fluid therethrough, while second valve 30', mounted above the tanks, passes only vaporized working fluid, as described below. Each valve 30, 30' comprises a cylindrical valve stem assembly 116 slidably disposed within a stem guide 118 housed within a valve body 120. Stem 116 is movable in opposite axial directions by steam pressure, as hereinafter described, into the first (FIG. 3A) and second (FIG. 3B) positions, enabling transverse bores 122a and 122b formed therein to communicate respectively with a straight transverse passage 124a (in the first position, FIG. 3A) and a cross passage 124b (in the second position, FIG. 3B) formed in the lower half of the valve body. In the first position, passage 124a communicates through bore 122a with a passage 126a formed in the upper half of the valve body to admit condensed fluid through the first valve and vaporized fluid through the second valve to drain tank 25a. In the second position, cross passage 124b interconnects passage 126a through bore 122b to a transverse passage 128a (formed in the lower half of each valve body) to fill the first tank.

A second pair of transverse bores 129a and 129b are provided in stem 116 to permit two way operation of each valve 30, 30' in the fluid cycling process. In the first position, bove 129a interconnects a transverse passage 130a formed in the upper half of first valve body 120 to passage 128a to fill tank 25b. In the second position, bore 129b interconnects passage 124a, 130a through a cross passage 132a formed in the first valve body to drain the second tank 25b while tank 25a fills, as described supra.

In first control valve 30, passage 128a is connected to a feed line 134 with a fitting 136 to receive condensed working fluid from condensor 20. Passage 124a is connected to a return line 138 with a fitting to drain fluid from tank 25a or 25b by gravity back to receiver 12. Depending on the position of valve 30 described below, condensed fluid flows to fill or drain from tank 25a through a line 140 interconnecting the bottom of the first tank to upper passage 126a. Likewise, condensed fluid can flow to fill or drain tank 25b through a line 142 interconnecting the bottom of the second tank to upper passage 130a.

In second control valve 30' (see FIG. 3B), upper passage 126a is connected to line 112 to direct a small quantity of vaporized working fluid from receiver 12 into the upper portion of tank 25a (first position, FIG. 6A) or 25b (second position, FIG. 3B) through the second valve and line 114a or 114b. The lines 114a, 114b are respectively connected to lower passages 124a, 128a of valve 30' and also serve to exhaust vaporized fluid from the tank 25a or 25b whichever is filling, to the low pressure side of condensor loop 22 through line 144 connected to upper passage 130a.

As mentioned briefly above, first and second control valves 30, 30' are actuated by pressure of vaporized working fluid supplied from receiver 12. As shown in FIGS. 3A and 3B, each valve 30, 30' includes a piston operated head assembly 150 affixed at opposite ends of valve body 120. Each assembly 150 has a piston cap 152 defining a chamber 153 containing a piston 154 axially movable therewithin. Pistons 154 are respectively secured to shaft formations 156 projecting longitudinally from each end of valve stems 116 through guide 118. Vaporized working fluid from receiver 12 enters chamber 153 through air inlet port 157 to alternately drive pistons 154 and thereby valves 30, 30' into first and second positions.

As can best be seen in FIG. 1, a small quantity of vaporized fluid is supplied to actuate each valve 30, 30' through a line 160 attached to line 112 with a T-connector 162. Line 160 delivers vaporized fluid to lines 164a and 164b which are respectively connected to the inlet side of a float operated valve 165 provided within each tank 25a, 25b. When the condensed fluid level in one of tanks 25a, or 25b (whichever is draining) reaches a predetermined low level, the associated valve 165 opens to admit vaporized fluid through the float valve to outlet line 167a or 167b which, as illustrated in FIGS. 4 and 5, can be a series of swagelock fittings connected together. Vaporized fluid then enters the left or right hand chamber 153 of each valve 30, 30' through lines 170a and 170b (left hand side) or 172a and 172b (right hand side) respectively to actuate the piston assemblies.

Figure 6A:
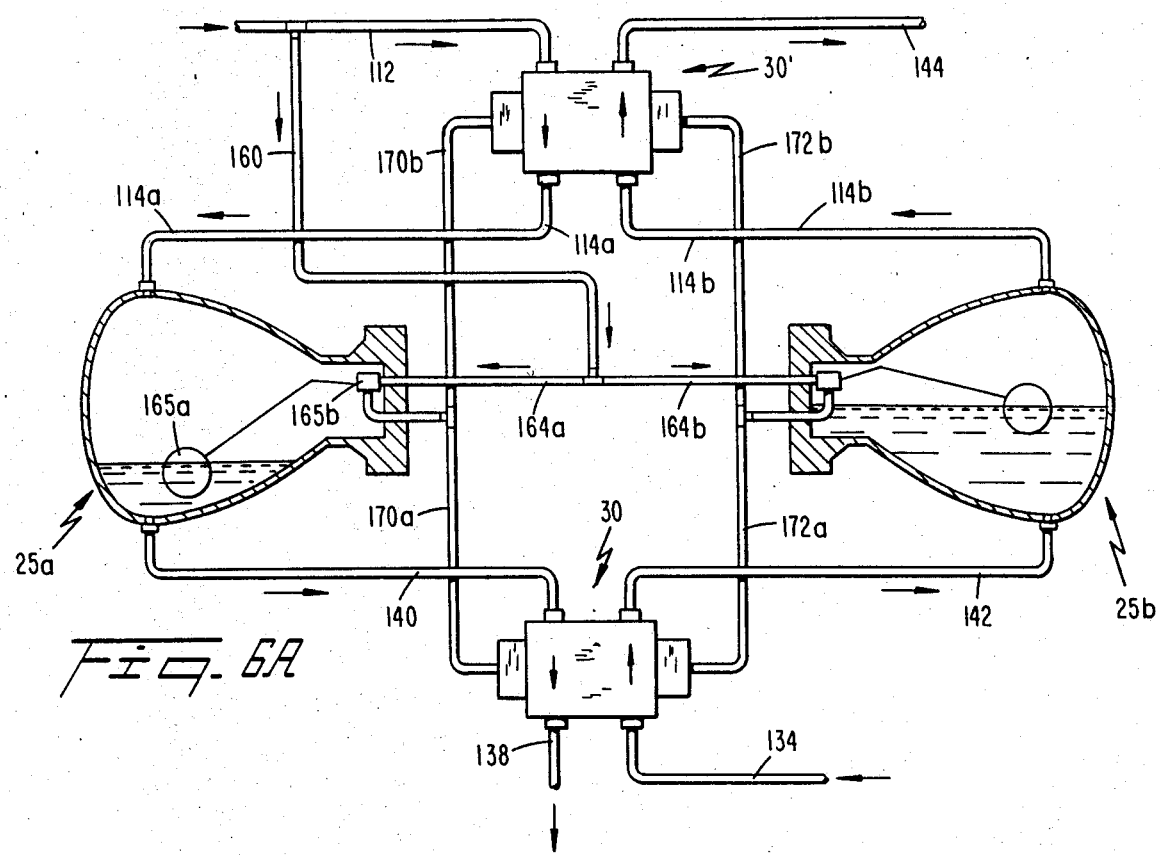
FIGS. 6A-6D are partial cross-sectional and schematic views of the first and second holding tanks forming part of the circulatory system of the invention to illustrate various operational stages of the first and second control valves and tank during a complete fill and drain cycle.

With reference to FIGS. 6A through 6D, a fill and drain cycle for tanks 25a, 25b is shown. In FIG. 6A, tank 25a is shown approaching the fully drained condition (i.e., supplying fluid by gravity to replenish boiler 12 for the next heatint cycle through line 140, first valve passage 122a, 124a and 126a, lines 138 and 32) with valves 30, 30' in the first position (FIG. 3A) while tank 25b is filling with condensed fluid supplied from condensor 20 (through pipes 134, first valve passages 128a, 129a and 130a, and pipe 142). Simultaneously, vaporized fluid under pressure enters the upper portion of tank 25a from the boiler (through line 112, second valve passages 122a, 124a and 126a and line 114a) to enhance flow of condensed flurd back to the boiler while preventing the tank from vacuumizing during the drain cycle.

Figure 6B:
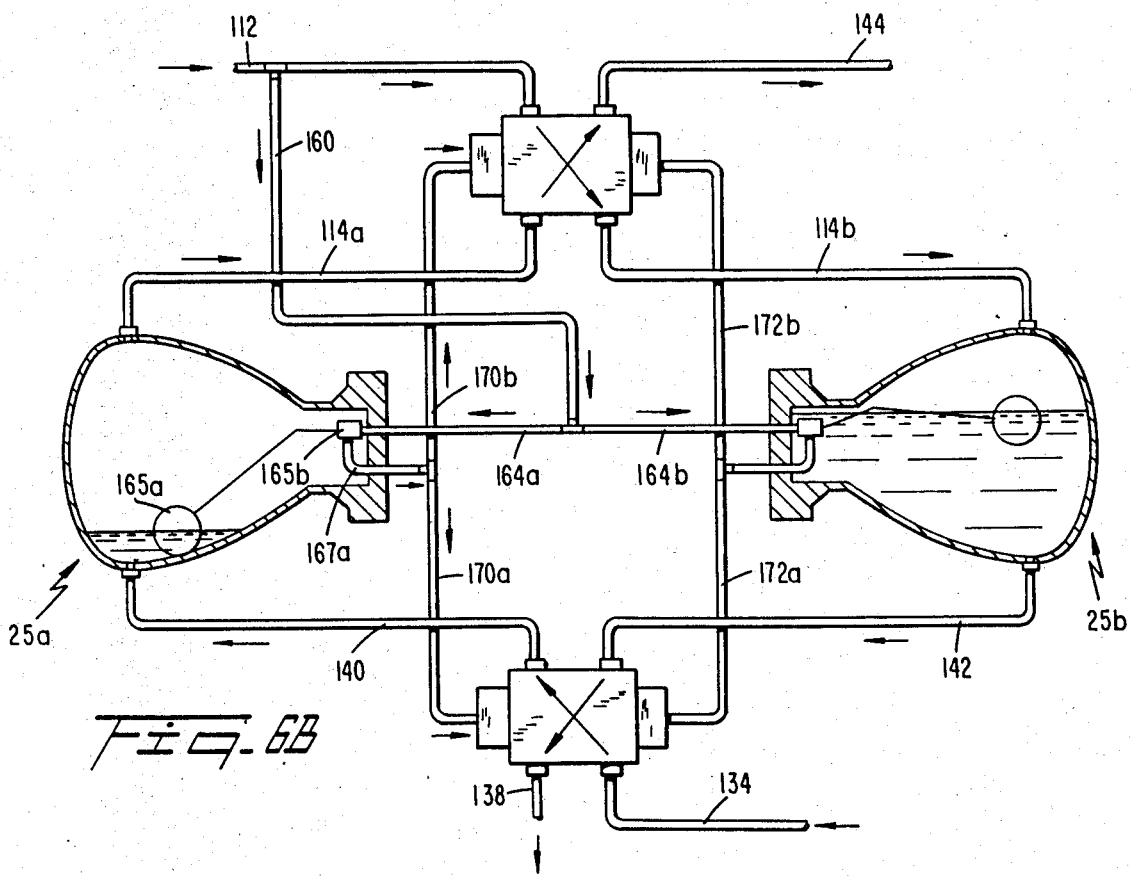

In FIG. 6B, the level of fluid in tank 25a has fallen sufficiently (i.e., to a predetermined minimum level) to cause weight 165a of float valve 165 to draw the poppet valve assembly 165b therein past its switching point. Float valve 165 in tank 25a thus opens, causing vaporized fluid supplied from boiler 12 (through lines 112, 160 and 164a) to flow through the valve and enter first and second control valves 30, 30' through lines 167a and 170a, 170b respectively. As vaporized fluid enters the left hand chamber 153 of each valve 30, 30', vapor pressure acts upon piston 154 to move valve stems 116 to the right (see FIG. 3B), thereby switching each control valve to the second position.

Figure 6C:
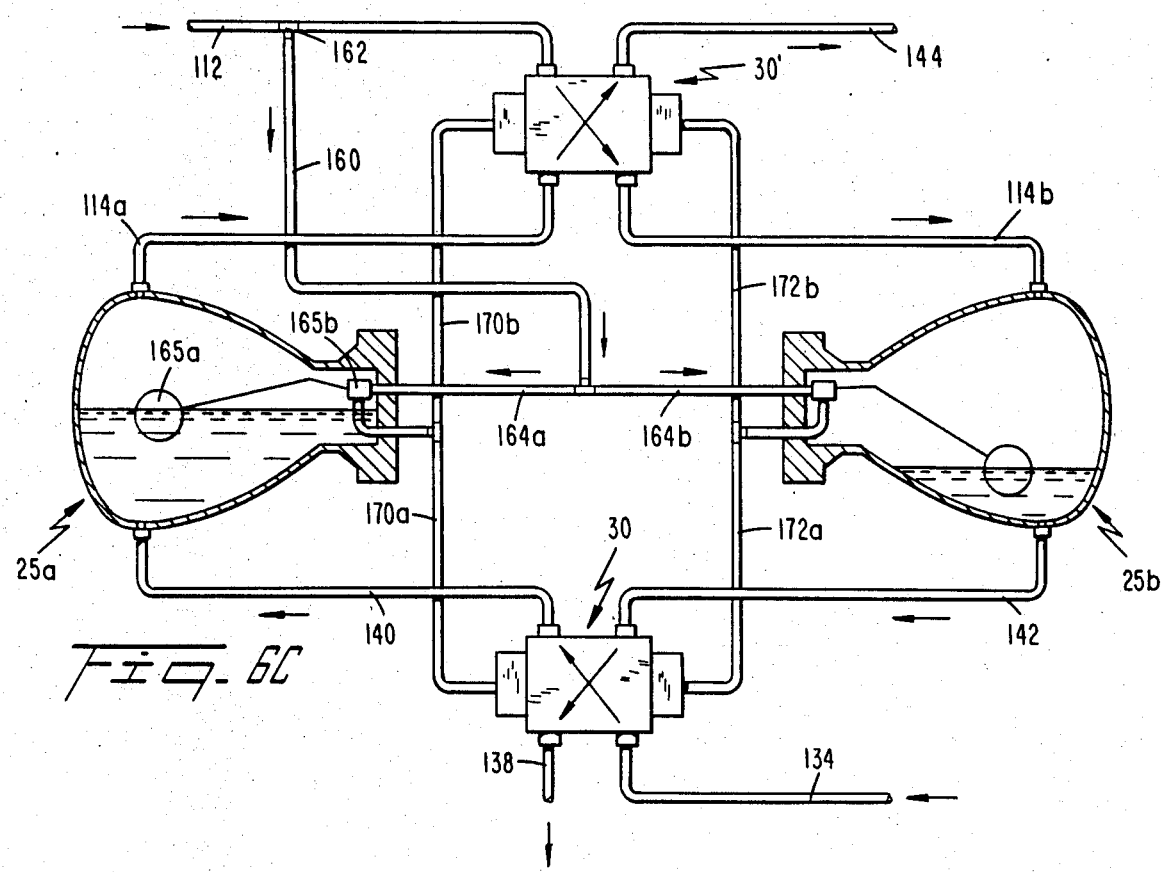

In the second position, as illustrated in FIGS. 6B and 6C, cross passageways 124b and 132a now communicate with valve stem bores 122b, 129b respectively to reverse the direction of both vaporized and condensed working fluid supplied to tanks 25a, 25b. Thus, condensed fluid supplied from condensor 20 now flows to fill tank 25a through lines 134 and 140 while condensed fluid in the filled tank 25b flows into reciever 12 through pipes 142 and 138. Gravity feed of fluid from tank 25b is enhanced by vaporized fluid now entering the upper part of the tank through lines 112 and 114b. Simultaneously, vaporized fluid present in tank 25a (previously draining to receiver 12) is in communication with condensor loop 22 through pipes 114a, 144 and second control valve 30'. In this manner, the high pressure vaporized fluid is drawn into the low pressure side of condensor loop 22, where it condenses to join the condensed fluid flow cycle. This action lowers the pressure within first tank 25a, now filling to permit condensed fluid to flow easily by gravity from the condensor into the first tank.

Figure 6D:
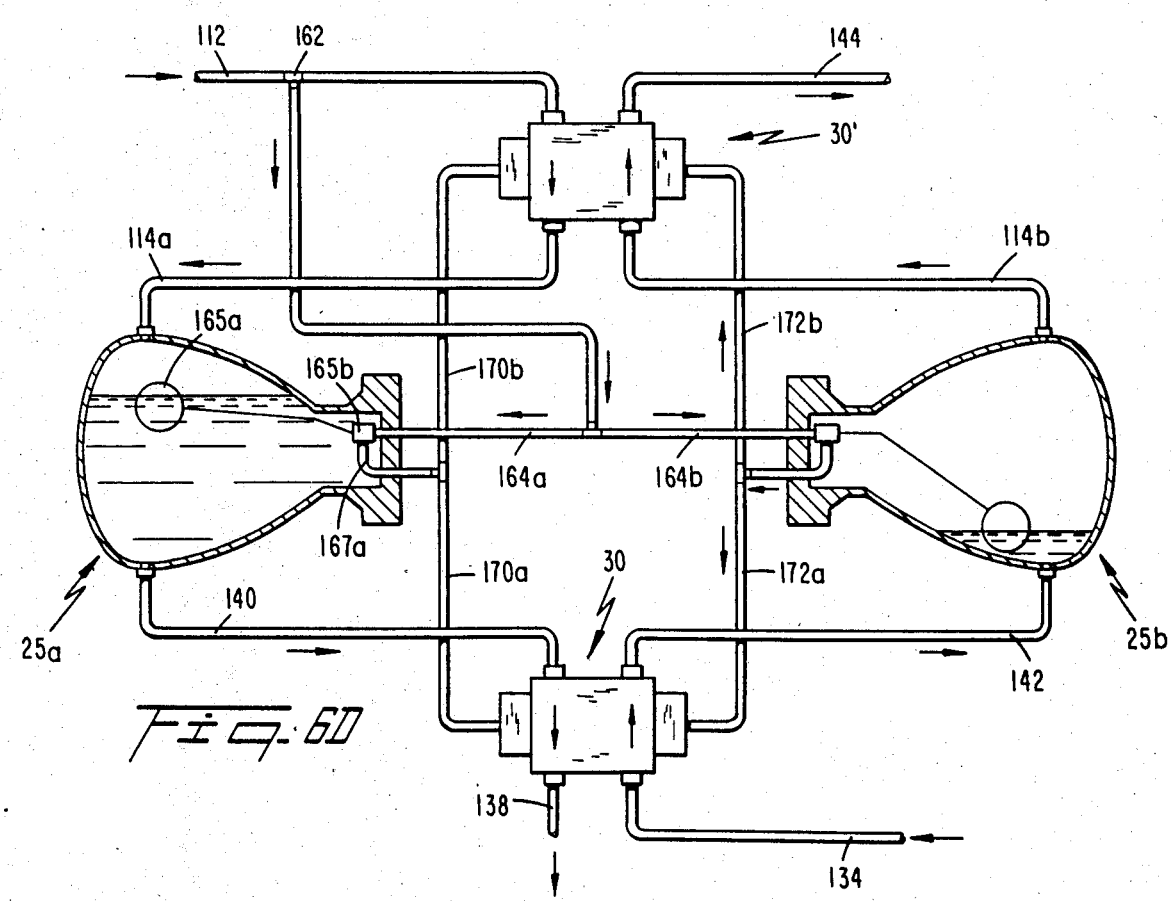

In FIG. 6D, fluid within draining tank 25b has reached the predetermined low level, causing float valve 165 therein to open and admit vaporized fluid into right hand chambers 153 of each valve 30, 30' through lines 172a, 172b. Valves 30, 30' are thereby moved back to their first positions (see FIG. 3A) so that the fill and drain cycle is reversed. Thus, tank 25a drains while tank 25b receives fluid from condensor 20 in the manner described above.

The recirculation system of the present invention provides automatic start up and cycling of condensed working fluid without the need for auxiliary pumps or other energy sources. Instead, the alternating fill and drain cycle is controlled by pressure of vaporized fluid acting upon steam actuated control valves 30, 30' in response to fluid levels within holding tanks 25a, 25b detected by float valves 165. Fluid thus flows under gravity back to replenish receiver 12 assisted by the action of steam entering the draining tank while vaporized fluid trapped in the filling tank (after the drain cycle terminates) communicates with condensor 20 to recondense so that maximum operating efficiency is obtained. Furthermore, tanks 25a, 25b can be mounted on suitable support racks (not shown) so that the tanks are located at approximately the same elevational position as the upper part of receiver 12 (see FIG. 1), thereby acting as a level control for fluid in the receiver. Thus, the recirculation system of the present invention has many advantages over prior art systems, including simplicity and economy of installation and operation.

To exhaust vaporized working fluid within steam lines 170a and 170b or 172a and 172b after steam actuated valves 30, 30' are moved into their second or first positions, respectively, lines 180 and 182 transmit vaporized fluid to a small transfer tank 184 for recondensation. As illustrated in FIG. 1 only, each line 180, 182 is respectively connected at one end thereof to steam lines 170a, 172a with T connectors 183. The opposite ends of lines 180, 182 are joined together with a T connector 185 so that vaporized fluid can enter the upper part of transfer tank 184 through a line 186. Thus, after vaporized fluid within the left of right hand steam line has energized first and second control valves 30, 30' into their first or second positions, the vaporized fluid therein recondenses and flows into tank 184 where it reenters the condensed fluid flow cycle through a pipe 188 connected to return line 134 with a T connector 189. A spherical float member 187 within tank 184 allows condensate to pass back to the vacuum side of the condensor without pressure loss in lines 180 and 182. Float 187 can also block the inlet opening of pipe 186 when line 188 is full of condensate to prevent backup of fluid from condensor return line 134 from entering the steam lines. Check valves 190 located within transfer lines 180, 182 respectively prevent vaporized fluid from the left hand steam lines from flowing into the right hand lines, and vice versa. In this manner, steam lines 170a, 170b or 172a, 172b are depressurized due to natural condensation after valve actuation occurs in the aforesaid manner to assure reliable valve switching operation during the fill and drain cycle. Also, a check valve 193 in line 134 prevents backup of fluid from tanks 25a, 25b or line 188 to condensor loop 22a.

It is preferable to preheat condensed working fluid, particularly an organic working fluid, entering receiver 12 through line 32 from one of tanks 25a or 25b, whichever is draining. Accordingly, as illustrated in FIG. 7, a regenerator 200 is provided having a heat pipe 208 connected between return line 32 and exhaust pipe 22 of engine 15. In a preferred embodiment, a chamber 204 receiving condensed working fluid is provided within line 32. A lower end 206 of a heat pipe 208 formed from a material having good heat exchange characteristics, such as copper, extends into chamber 204 in thermal contact with working fluid therein. Pipe 208 extends upwardly out of chamber 204 and has a closed upper end 206a that enters engine exhaust pipe 22 in proximity to discharge ports 17b and in thermal contact with hot, vaporized working fluid discharged from the ports.

Wick 202, formed from a porous material having good suck-up characteristics, includes a lower end 202a that extends into a small quantity of condensed working fluid 211 located in the bottom of lower end 206 of heat pipe 208, and an upper portion 202b that extends through the heat pipe into closed upper end 206a thereof. In operation, condensed fluid 211 is drawn upwardly by capillary action through wick 202 into upper end 206a of the heat pipe where thermal contact with hot condensed fluid discharged from engine 15 causes fluid 211 in the wick to vaporize. This hot vapor then flows downwardly through pipe 208 to carry heat into lower section 206 thereof in thermal contact with working fluid entering chamber 204 from line 32. In this manner, working fluid is preheated before entering receiver 12 to improve boiler efficiency. As the hot vapor in lower pipe section 206 gives up its latent heat of vaporization to surrounding working fluid in chamber 204, the vapor recondenses into fluid 211 to renew the regenerative cycle.

It should be noted that heat pipe 208 is vacuumized slightly to regulate the preheating temperature of vaporized fluid 211 to a level slightly below the boiling temperature of condensed working fluid entering chamber 204 from one of tanks 25a or 25b, whichever is draining into line 32. Further, since working fluid in line 32 is under a high pressure from the draining tank 25a or 25b, the boiling temperature thereof is higher than, for example, working fluid filling one of tanks 25a or 25b so that fluid preheated by regenerator 200 does not bo before entering receiver 12.

Insulation 212 surrounds exposed portion of heat pipe 208 extending between chamber 204 and discharge pipe 22 to minimize heat loss of vaporized fluid 211 traveling downwardly through the heat pipe into lower section 206 thereof.

The foregoing description of a preferred embodiment of the present invention has been presented for purposes of illustration and description. It is not intended to be exhaustive or to limit the invention to the precise form disclosed, and obviously many modifications and variations are possible, in light of the above teachings. For example, valves 30, 30', steam lines 170a, 170b 172a, 172b, steam supply lines 160 and 164a, 164b and the steam and condensed fluid lines interconnecting the control valve to first and second tanks 25a, 25b can be replaced by fluidic blocks having internal passageways formed therein and attached to the first and second tanks. In this manner, the holding tank and valve arrangement of the invention can be fabricated as a single unit mounted above receiver 12 on an appropriate mounting rack. Also, valves 30, 30' can be switched between the first and second positions by means of electrically operated solenoid valves (not shown), when a source of electricity is available, which drive valve stems 116, actuated by appropriate switch means in float valves 165 detecting low fluid levels in tanks 25a, 25b. Of course, if solenoid valves are employed, the lines supplying vaporized fluid to actuate pistons 154 in valves 30, 30' can be dispensed with. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A closed loop solar collector system, comprising:
   (a) a fluid receiver for collecting solar heat to vaporize a working fluid therein;
   (b) motor means driven by said vaporized fluid for supplying power to a load;
   (c) condensor means receiving said vaporized working fluid discharged from the motor means for absorbing heat energy from said fluid, said vaporized fluid condensing after releasing its latent heat of vaporization in said condensor means;
   (d) fluid supply means connected for receiving controlled quantities of the condensed working fluid by gravity, said fluid supply means including first and second tanks connected to alternately receive said fluid from the condensor means and deliver said fluid to the receiver; and
   (e) valve means, responsive to fluid levels within the first and second tank, for alternately connecting each tank, in a fill and drain cycle, to the condensor and receiver respectively, when said valve means is respectively in first and second positions, said valve means being actuated by pressure of vaporized fluid supplied from the receiver when fluid levels in said first and second tanks reach predetermined levels, and including means for further connecting said first and second tanks to the condensor and receiver through the valve means to (1) supply vaporized working fluid from said receiver to one of said first and second tanks delivering condensed fluid to the receiver in the drain cycle to prevent vacuumization of the draining tank and provide a positive pressure tending to assist in draining of the tank, and (2) exhaust vaporized working fluid in one of said first and second tanks receiving condensed working fluid from the condensor in the fill cycle to a low pressure side of the condensor where the vaporized fluid condenses to join the condensed fluid flow.

2. The system of claim 1, wherein said valve means includes a pair of float actuated valve assemblies provided respectively in said first and second tanks, and first and second control valves actuated by pressure of vaporized fluid supplied from the receiver.

3. The system of claim 2, wherein each of said first and second control valves includes a valve body, a valve stem reciprocably movable within the valve body to define inlet and exhaust passageways, first and second piston operated heat assemblies for respectively moving the valve stem into first and second positions, first steam conduit means for supplying pressurized, vaporized working fluid to the first piston of each control valve through the first float valve assembly, when open, causing each control valve to move into the first position, and second steam conduit means for supplying pressurized, vaporized working fluid to each second piston through the second float valve assembly, when open, causing each control valve to move into the second position.

4. The system of claim 3, wherein said second control valve is connected to feed pressurized, vaporized fluid from the receiver to the first tank and discharge vaporized fluid from the second tank to the condensor means in said first position, said first control valve being connected to drain fluid from the first tank for delivery to the receiver while feeding condensor fluid to the second tank from said condensor means in said first position, said first and second valves switching to the second position when fluid in the first tank reaches a predetermined low level, causing the fluid float assembly to open and admit vaporized fluid into the second conduit means.

5. The system of claim 4, wherein said second control valve is connected to feed pressurized, vaporized fluid from the receiver to the second tank and discharge vaporized fluid from the first tank to the condensor means in said second position, said first control valve being connected to drain fluid from the second tank for delivery to the receiver while feeding condensed fluid to the first tank from said condensor means in said second position.

6. The system of claim 5, further including means for connecting the first and second steam conduit means respectively to the condensor means, enabling vaporized fluid in said first and second conduit means to condense and feed into the condensor means for recirculation as condensed fluid, and further including check valve means preventing communication between said first and second conduit means so that vaporized fluid or condensate does not flow from the first conduit to the second conduit and vice versa.

7. The system of claim 6, wherein said connecting means includes a float valve assembly interconnecting each first and second conduit through a return line to a feed line feeding condensed fluid from the condensor means to the second control valve, said float assembly including a float member preventing condensate from entering said first and second conduit means while enabling condensed fluid in said first and second conduit means to pass through the float valve assembly for delivery into the return line.

8. The system of claim 7, further including a check valve located in said feed line to prevent a backup flow of condensed fluid from said feed line to the condensor means.

9. The system of claim 5, further including check valve means located in a line connecting the first control valve to the condensor means for preventing backup fluid flow from the tanks to the condensor means.

10. The system of claim 5, wherein said motor means is a uniflow engine including a cylinder having a pair of inlet openings respectively located at opposite ends thereof and a central discharge port between the inlet openings, said inlet openings communicating with the receiver to receive pressurized, vaporized fluid through an intake line;

a piston movable within said cylinder including a drive shaft connected for delivery of power;

first and second normally closed poppet inlet valves respectively located to open and close each inlet opening, each poppet valve being opened upon contact with said piston traveling into an end of stroke position to admit pressurized fluid into one of a pair of cylinder chambers located respectively on opposite sides of the piston, said chamber communicating with said receiver through the first and second inlet valves; and a connecting rod simultaneously engageable with a rod of each said inlet valve for coordinating opening and closing of each of said first and second valves when pressure of vaporized fluid supplied to said engine is below a predetermined pressure level, including detent means for retaining said connecting rod means in a stationary position to maintain the first inlet valve open and the second inlet valve closed as said piston travels out of contact with the first inlet valve, said connecting rod means being movable to close the first inlet valve and open the second inlet valve when the piston contacts the second inlet valve with a force sufficient to overcome the bias of the detent means, said connecting rod means and detent means thereby maintaining one of said first or second valves open and the other valve closed when pressure of fluid is below said predetermined level to enable start-up of said engine and operation thereof in a nonexpanded state.

11. The system of claim 10, further comprising means for disengaging the connecting rod from said first and second inlet valves when pressure of vaporized fluid supplied to the engine is at or above said predetermined pressure level, thereby enabling the quantity of pressurized, vaporized fluid entering each chamber through one of said open first or second inlet valves to be controlled by the amount of time each valve is open through direct contact between its associated valve rod and the piston, whereby said engine operates in an expanding piston state above said predetermined pressure level.

12. The system of claim 11, wherein said disengaging means includes a flywheel or centrifugal clutch driven by the piston drive shaft, said flywheel having circumferentially mounted, radially inwardly biased, weights displaced outwardly when subjected to sufficient centrifugal force during flywheel rotation corresponding to vaporized fluid pressure reaching said predetermined level in the engine; a follower tangentially contacting said weights and pivotally mounted at a fulcrum point intermediate the connecting arm and a flywheel, and a lever arm having one end attached to the follower fulcrum point and an opposite end contacting the connecting rod, said lever arm being operable to pivot downwardly against the connecting rod to disengage same from the first and second inlet valves during corresponding upward pivotal movement of the follower caused by outward displacement of the weights.

13. The system of claim 12, wherein said flywheel is connected to a pump means for pumping water or the like from the ground.

14. A system for recirculating a working fluid through a boiler for reheating of the working fluid from a liquid state to a vaporized state thereof, comprising:
    (a) heat utilizing means, connected to said boiler, to receive said vaporized working fluid therefrom, for absorbing a first portion of the enthalpy of said vaporized working fluid for utilizing the same;
    (b) heat exchanger means for receiving said working fluid from said heat utilizing means and removing therefrom a second portion of the enthalpy thereof, whereby said working fluid condenses to its liquid state;
    (c) fluid flow control means for receiving the condensed working fluid by gravity from the heat exchanger means and positioned for feeding the condensed working fluid in controlled quantities by gravity to the boiler, said fluid flow control means including first and second tanks respectively connected to alternately receive the condensed working fluid from the heat exchanger means and deliver the same to the boiler; and
    (d) valve means, responsive to the respective fluid levels in the first and second tanks, for alternately connecting each tank, in a fill and drain cycle, to the heat exchanger means and boiler respectively when said valve means is in first and second positions thereof, said valve means being connected to the boiler for actuation by pressure of vaporized working fluid supplied from the boiler when said fluid levels in said first and second tanks reach respective predetermined levels.

15. A system for recirculating a working fluid in a condensed state to a boiler for reheating into a vaporized state comprising:
    (a) heat utilizing means, connected to said boiler, to receive said vaporized working fluid therefrom, for absorbing a portion of the enthalpy of said vaporized working fluid for utilizing the same;
    (b) heat exchanger means for receiving said working fluid from said heat utilizing means and removing therefrom a second portion of the enthalpy thereof, whereby said working fluid condenses to its liquid state;
    (c) fluid flow control means for receiving the condensed working fluid from the heat exchanger means and feeding the same in controlled quantities by gravity to the boiler, said fluid flow control means including first and second tanks respectively connected to alternately receive the condensed working fluid from the heat exchanger means and deliver the same to the boiler;
    (d) valve means, responsive to the respective fluid levels in the first and second tanks, for alternately connecting each tank, in a fill and drain cycle, to the heat exchanger means and boiler respectively when said valve means is in first and second positions thereof, said valve means comprising electrically operated solenoid valve means actuated by switch means responsive to fluid levels in said first and second tanks reaching predetermined levels.

16. A closed loop solar energy conversion system, comprising:
    (a) a solar energy receiver for receiving solar energy to vaporize a working fluid controllably flowed therethrough;
    (b) motor means driven by said vaporized working fluid for thereby converting a portion of the received solar energy into a more readily used form of energy and supplying the same to a load;
    (c) condenser means receiving said vaporized working fluid discharged from the motor means for absorbing thermal energy from said vaporized working fluid to condense the same;
    (d) fluid supply means connected to the condenser means for receiving the condensed working fluid therefrom by gravity, said fluid supply means including first and second tanks connected to alternately receive a controlled quantity of said condensed working fluid from the condenser means and then deliver the same to the solar energy receiver; and
    (e) valve means, having positions responsive to fluid levels within the first and second tanks, for alternately connecting each tank, in a fill and drain cycle, to the condenser and receiver respectively, depending on the prevailing fluid levels in the tanks, and including means for supplying a second fluid to that one of said first and second tanks which is delivering condensed working fluid to the solar energy receiver in the fill and drain cycle to prevent vacuumization of the delivering tank and instead provide a positive pressure tending to facilitate said delivery from the then delivering tank, and exhausting said second fluid from that one of said first and second tanks which is receiving condensed working fluid from the condensor in the fill and drain cycle to thereby lower the pressure within said than receiving tank to facilitate the filling thereof.

17. A closed loop solar collector system, comprising:
    (a) a fluid receiver for collecting solar heat to vaporize a working fluid therein;
    (b) motor means driven by said vaporized fluid for supplying power to a load;
    (c) condensor means receiving said vaporized working fluid discharged from the motor means for absorbing heat energy from said fluid, said vaporized fluid condensing after releasing its latent heat of vaporization in said condensor means;
    (d) fluid supply means connected for receiving controlled quantities of the condensed working fluid by gravity, said fluid supply means including first and second tanks connected to alternately receive said fluid from the condensor means and deliver said fluid to the receiver; and
    (e) valve means, responsive to fluid levels within the first and second tanks, for alternately connecting each tank, in a fill and drain cycle, to the condenser and receiver respectively, when said valve means is respectively in first and second positions, said valve means being actuated by pressure of vaporized fluid supplied from the receiver when fluid levels in said first and second tank reach predetermined levels, and means for relieving said valve means from said pressure of vaporized fluid to enable said valve means to switch between said first and second positions, said relieving means being connected to exhaust pressure of vaporized fluid so that said vaporized fluid condenses to join the condensed fluid flow.

18. A system for recirculating a working fluid through a boiler for reheating of the working fluid from a liquid state to a vaporized state thereof, comprising:
 (a) heat utilizing means, connected to said boiler, to receive said vaporized working fluid therefrom, for absorbing a first portion of the enthalpy of said vaporized working fluid for utilizing the same;
 (b) heat exchanger means for receiving said working fluid from said heat utilizing means and removing therefrom a second portion of the enthalpy thereof, whereby said working fluid condenses to its liquid state;
 (c) fluid flow control means for receiving the condensed working fluid by gravity from the heat exchanger means and positioned for feeding the condensed working fluid in controlled quantities by gravity to the boiler, said fluid flow control means including first and second tanks respectively connected to alternately receive the condensed working fluid from the heat exchanger means and deliver the same to the boiler; and
 (d) valve means, responsive to the respective fluid levels in the first and second tanks, for alternately connecting each tank, in a fill and drain cycle, to the heat exchanger means and boiler respectively when said valve means is in first and second positions thereof, said valve means being connected to the boiler for actuation by pressure of vaporized working fluid supplied from the boiler when said fluid levels in said first and second tanks reach respective predetermined levels, and means for relieving said valve means of pressure of vaporized working fluid acting thereon by exhausting said vaporized fluid where it condenses to join the condensed fluid flow, thereby enabling said valve means to switch between said first and second positions.

19. A system for recirculating a working fluid through a boiler for reheating of the working fluid from a liquid state to a vaporized state thereof, comprising:
 (a) heat utilizing means, connected to said boiler to receive said vaporized working fluid therefrom, for absorbing a portion of the enthalpy of said vaporized working fluid for utilizing the same;
 (b) heat exchanger means for receiving said working fluid from said heat utilizing means and removing therefrom a second portion of the enthalpy thereof, whereby said working fluid condenses to its liquid state;
 (c) fluid flow control means for receiving the condensed working fluid from the heat exchanger means and feeding the same in controlled quantities to the boiler, said fluid flow control means including first and second tanks respectively connected to alternately receive the condensed working fluid from the heat exchanger means and deliver the same to the boiler;
 (d) valve means, responsive to the respective fluid levels in the first and second tanks, for alternately connecting each tank, in a fill and drain cycle, to the heat exchanger means and boiler respectively when said valve means is in first and second positions thereof, said valve means being actuated when fluid levels in said first and second tanks reach predetermined levels, and including means for further connecting said first and second tanks to the heat exchanger means and boiler through said valve means (1) to supply vaporized working fluid from said boiler to that one of said first and second tanks which is then draining to deliver condensed working fluid to the boiler in course of said fill and drain cycle to prevent vacuumization of said draining tank and to provide instead a positive pressure tending to assist in draining of said draining tank, and (2) to exhaust vaporized working fluid from the other one of said first and second tanks which is then filling by receiving condensed working fluid from the heat exchanger means in the course of said fill and drain cycle to a low pressure side of the heat exchanger means where vaporized working fluid is condensing to join the condensed working fluid flow, said exhaustion of vaporized fluid from said filling tank serving to lower the pressure within said filling tank to assist in the filling of said filling tank with condensed fluid.

20. A system for recirculating a working fluid through a boiler for reheating of the working fluid from a liquid state to a vaporized state thereof, comprising:
 (a) heat utilizing means, connected to said boiler, to receive said vaporized working fluid therefrom, for absorbing a first portion of the enthalpy of said vaporized working fluid for utilizing the same;
 (b) heat exchanger means for receiving said working fluid from said heat utilizing means and removing therefrom a second portion of the enthalpy thereof, whereby said working fluid condenses to its liquid state;
 (c) fluid flow control means for receiving the condensed working fluid by gravity from the heat exchanger means and positioned for feeding the condensed working fluid in controlled quantities by gravity to the boiler, said fluid flow control means including first and second tanks respectively connected to alternately receive the condensed working fluid from the heat exchanger means and deliver the same to the boiler; and
 (d) valve means, responsive to the respective fluid levels in the first and second tanks, for alternately connecting each tank, in a fill and drain cycle, to the heat exchanger means and boiler respectively when said valve means is in first and second positions thereof, said valve means being connected to the boiler for actuation by pressure of vaporized working fluid supplied from the boiler when said fluid levels in said first and second tanks reach respective predetermined levels, and including means for preventing vacuumization of the then draining tank during said fill and drain cycle, and means for relieving the pressure in the tank then receiving condensed working fluid from the heat exchanger means in the fill and drain cycle to thereby facilitate filling of said receiving tank.

21. A system for transferring a condensed liquid, by gravity, from a source location to a demand location, comprising:
 (a) a first tank and a second tank for receiving the liquid from the source location and subsequently providing the same to the demand location, the first and second tanks also containing a pressure equalizing fluid to fill the respective balance of the available capacity of each;

(b) first means for conveying the liquid from the source location to fill one of first and second tanks;

(c) second means for conveying the liquid from the other one of said first and second tanks to said demand location;

(d) valve means, responsive to the prevailing liquid levels within the first and second tanks, to alternately connect the tanks, in a fill and drain cycle, to the source location and demand location respectively when said valve means is in corresponding operative positions; and (e) means for increasing the pressure of the pressure equalizing fluid in that one of said first and second tanks which is delivering liquid therefrom to the demand location to prevent vacuumization of the then delivering tank, and means for reducing the pressure of the pressure equalizing fluid from that one of said first and second tanks which is receiving the liquid from said source location to facilitate filling of said then receiving tank by reducing back pressure tending to impede flow of said liquid therein, wherein said pressure equalizing fluid is a vaporized form of said liquid.

* * * * *